US011429967B2

(12) United States Patent
Fedorov et al.

(10) Patent No.: US 11,429,967 B2
(45) Date of Patent: Aug. 30, 2022

(54) MECHANISM FOR EFFICIENT VALIDATION OF FINALITY PROOF IN LIGHTWEIGHT DISTRIBUTED LEDGER CLIENTS (71) Applicant: NEC Laboratories Europe GmbH, Heidelberg (DE)

(72) Inventors: Sergey Fedorov, Dossenheim (DE); Wenting Li, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 248 days.

(21) Appl. No.: 15/919,301

(22) Filed: Mar. 13, 2018

(65) Prior Publication Data
US 2019/0287105 A1 Sep. 19, 2019

(51) Int. Cl.
| | |
|---|---|
| *G06Q 20/40* | (2012.01) |
| *H04L 9/06* | (2006.01) |
| *H04L 9/32* | (2006.01) |
| *H04L 9/40* | (2022.01) |
| *H04L 9/08* | (2006.01) |
| *G06F 21/64* | (2013.01) |
| *H04L 67/104* | (2022.01) |
| *G06Q 40/00* | (2012.01) |
| *H04L 9/00* | (2022.01) |

(52) U.S. Cl.
CPC .......... *G06Q 20/401* (2013.01); *G06F 21/64* (2013.01); *H04L 9/0637* (2013.01); *H04L 9/08* (2013.01); *H04L 9/3247* (2013.01); *H04L 63/12* (2013.01); *G06Q 40/12* (2013.12); *H04L 9/50* (2022.05); *H04L 67/104* (2013.01)

(58) Field of Classification Search
CPC ..... G06Q 20/401; G06F 21/64; H04L 9/0637; H04L 63/12
See application file for complete search history.

(56) References Cited

U.S. PATENT DOCUMENTS

| | | | |
|---|---|---|---|
| 9,331,856 B1* | 5/2016 | Song ....................... | G06F 21/64 |
| 2010/0217853 A1* | 8/2010 | Alexander ............. | H04L 63/20 |
| | | | 709/223 |
| 2017/0250972 A1 | 8/2017 | Ronda et al. | |
| 2017/0330174 A1* | 11/2017 | Demarinis ............. | G06Q 40/04 |

(Continued)

FOREIGN PATENT DOCUMENTS

| | | | | |
|---|---|---|---|---|
| WO | WO-2013136235 A1 * | 9/2013 | ........... | H04L 9/0816 |
| WO | WO 2017036546 A1 | 3/2017 | | |
| WO | WO-2018158936 A1 * | 9/2018 | ........... | G06Q 20/401 |

OTHER PUBLICATIONS

Vitalik Buterin, Light Clients and Proof of Stake, Jan. 2015, Ethereum. Org (Year: 2015).*

(Continued)

*Primary Examiner* — Patrick McAtee
*Assistant Examiner* — Terry Nathan Murray
(74) *Attorney, Agent, or Firm* — Leydig, Voit & Mayer, Ltd.

(57) ABSTRACT

In a method for validation of a finality proof in a distributed ledger system network a support node collects a required number of confirmations from the distributed ledger system network indicating that a requested transaction is finalized. The support node generates the finality proof based on the collected confirmations. The support node transmits the finality proof to a trusted agent for verification.

11 Claims, 7 Drawing Sheets

(56) References Cited

U.S. PATENT DOCUMENTS

| | | | | |
|---|---|---|---|---|
| 2017/0331896 | A1* | 11/2017 | Holloway | H04L 9/12 |
| 2018/0025435 | A1* | 1/2018 | Karame | G06Q 40/12 |
| | | | | 705/30 |
| 2018/0082023 | A1* | 3/2018 | Curbera | H04L 9/3236 |
| 2018/0218027 | A1* | 8/2018 | Cronie | G09C 1/00 |
| 2019/0028276 | A1* | 1/2019 | Pierce | G06Q 20/3827 |
| 2019/0034465 | A1* | 1/2019 | Shimamura | G06F 16/23 |
| 2019/0228133 | A1* | 7/2019 | Ansari | H04L 9/3247 |
| 2019/0251007 | A1* | 8/2019 | Mac Brough | H04L 9/3239 |
| 2019/0268142 | A1* | 8/2019 | Leker | H04L 9/3218 |
| 2019/0287105 | A1* | 9/2019 | Fedorov | H04L 9/08 |
| 2019/0363874 | A1* | 11/2019 | Shirley | H04L 9/0643 |
| 2019/0386834 | A1* | 12/2019 | Furukawa | H04L 9/3247 |

OTHER PUBLICATIONS

Tim Swanson, Distributed Ledger System, Apr. 2016, R3 CEV (Year: 2016).*

Xiwei Xu, Blockchain as Software Connector, NICTA, Australian Research Council, 2016 (Year: 2016).*

Thibaut Sardan, What is a light client and why you should care?, Jul. 2018, Parity Technologies (Year: 2018).*

Furukaya, Ryo, Blockchain Management Device, 2017, WIPO (Machine Translation) (Year: 2017).*

Ronda, Troy, Systems and Methods for Distributred Identity Verification, 2017, WIPO (Machine Translation) (Year: 2017).*

Gideon Greenspan et al : "MultiChain Private Blockchain—White Paper", Jul. 24, 2015 (Jul. 24, 2015), XP055588977, Retrieved from the Internet/MultiChain-White-Paper.pdf> (Year: 2015).*

Wenting Li, Alessandro Sforzin, Sergey Fedorov, Ghassan Karame (Apr. 2, 2017) "Towards Scalable and Private Industrial Blockchains" In Proceedings of the ACM ASIACCS Workshop on Blockchain, Cryptocurrencies, and Contracts. http://www.ghassankarame.com/BCC17_Blockchain.pdf.

Hyperledger Fabric documentation, v1.1.0—preview, http://readthedocs.org/projects/hyperledger-fabric/downloads/pdf/v1.1.0-preview/ (Nov. 2, 2017).

Muoi Trans, Loi Luu, Min Suk Kang, Iddo Bentov, and Prateek Saxena: "Obscuro: A Bitcoin Mixer using Trusted Execution Environments" (Dec. 31, 2017) (https://eprint.iacr.org/2017/974.pdf).

Alin Tomescu, and Srinivas Devadas: "Catena: Efficient Non-equivocation via Bitcoin" (May 22, 2017) 2017 IEEE Symposium on Security and Privacy.

* cited by examiner

MECHANISM FOR EFFICIENT VALIDATION OF FINALITY PROOF IN LIGHTWEIGHT DISTRIBUTED LEDGER CLIENTS

FIELD

The present invention relates to a method and system for a secure and efficient validation of a proof of distributed ledger state in a distributed ledger system.

BACKGROUND

Blockchain technology provides a decentralized, open, Byzantine fault-tolerant transaction mechanism. Blockchain technology is becoming common for various types of Internet interactions, including anonymous online payments, remittance, and the transaction of digital assets.

Validation of a ledger in distributed ledger systems typically requires replication of the ledger and distribution of the ledger among numerous stakeholders. This requires client nodes in the network capable of processing and storing the full ledger. Some existing solutions, including Bitcoin SPV and Ethereum light client protocol, reduce the usage of processing resources on a client node, but still require a substantial amount of computation and storage to store and verify the partial state of the ledger. Depending on the distributed consensus protocol used in the system, verification of a proof of distributed ledger state may require validation of a series of block headers or validation of a set of peer signatures. These solutions may require retrieval of a contiguous sequence of block headers from the full ledger.

These processes are especially expensive computational operations in the case of byzantine fault-tolerant consensus protocols. Such byzantine fault-tolerant consensus protocols are generally desirable in permissioned distributed ledger systems. In these systems, a client would still have to retrieve and verify a large set of signatures, proportional to the number of peers in the distributed ledger network.

SUMMARY

Embodiments provide a method for validation of a finality proof in a distributed ledger system network. The method includes collecting, by a support node, a required number of confirmations from the distributed ledger system network indicating that a requested transaction is finalized. The support node generates the finality proof based on the collected confirmations. The support node transmits the finality proof to a trusted agent for verification.

In another embodiment, a distributed ledger system comprising one or more processors which, alone or in combination, are configured to provide for performance of a number of steps. The steps include collecting, by a support node, a required number of confirmations from the distributed ledger system network indicating that a requested transaction is finalized. The support node generates the finality proof based on the collected confirmations. The support node transmits the finality proof to a trusted agent for verification.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A problem unique to computer networks and solved by embodiments of the present invention is to provide a computationally efficient system for validation of a ledger in distributed ledger system. Many industrial use cases require a lightweight client (a lightweight node) in the system that can maintain a partial yet assured state of the full distributed ledger. Existing systems including Bitcoin SPV and Ethereum light client protocol, reduce the usage of processing resources on a client node, but still require a substantial amount of computation and storage to store and verify the partial state of the ledger. This makes it difficult or undesirable to use such solutions in end-point node devices with limited processing resources. For example, many internet of things (IoT) devices, embedded hardware, smartphones and browser extensions cannot use existing solutions for validation of a ledger in a distributed ledger system. However, in contrast to existing solutions, embodiments of the invention provide an efficient distributed ledger system which can be used by lightweight clients.

In an embodiment, the invention provides secure and efficient validation of a proof of distributed ledger state in a distributed ledger system. The efficiency of the mechanism makes it suitable to use in lightweight end-point devices. These lightweight end-point devices can then leverage blockchain technology even with their reduced processing resources. According to embodiments of the invention, usage of processing resources for the validation of the ledger state on the end-point device is minimized. Embodiments of the invention use a trusted execution environment to provide a sufficient level of security.

Figure 1:
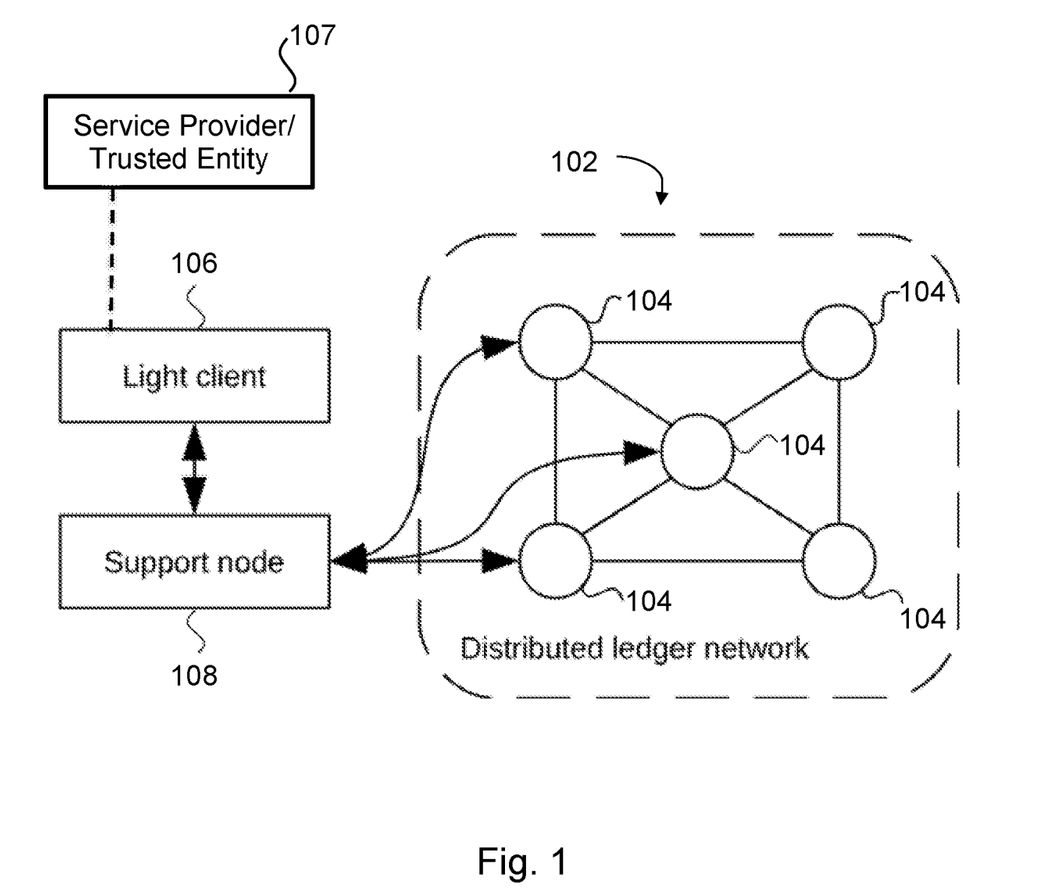
FIG. 1 illustrates a distributed ledger system including a light client and support node according to an embodiment.

FIG. 1 illustrates a distributed ledger network 102 according to an embodiment. A distributed ledger (DL) system is a peer-to-peer network of interconnected nodes. For example, the distributed ledger network 102 may include one or more DL nodes, such as interconnected nodes 104. The nodes maintain a replicated ledger of an ordered sequence of transaction records. A specific consensus protocol is executed by the nodes to ensure consistency, reliability and integrity of the ledger as new transactions are appended to it.

Certain criteria, known as finality criteria, must be met for a particular fact to be considered immutably recorded, or finalized, in the distributed ledger with a sufficient level of assurance. The finality criteria are defined depending on the specific consensus protocol used in the DL system and the required level of assurance for the system. A finality proof is a piece of information sufficient to provide evidence to an entity not participating in the distributed ledger consensus protocol process that the finality criteria has been fulfilled for a specific fact and it has been finalized in the distributed ledger.

In the illustrated embodiment, a light client 106 with restricted processing resources does not participate in distributed ledger consensus protocol process but wants to ensure finality proofs for certain facts finalized in the distributed ledger.

A light client support node 108 serves as an intermediary between the light client 106 and the DL network 102. The support node sufficient processing resources to perform full validation of a finality proof received from the DL network 102. In some embodiments, the support node 108 is not controlled by an entity trusted by the light client 106. Some example light clients 106 include internet of things (IoT) devices, embedded hardware, smartphones and browser extensions.

According to certain embodiments, a light client service provider 107 is an entity trusted by the light client 106. In these embodiments, the service provider 107 is a trusted entity or trusted agent. In other embodiments, the trusted entity or trusted agent can be a separate computing entity. The light client service provider is authorized by the light client 106 to carry out full validation of a finality proof and certify the result. The service provider 107 is trusted by the light client 106. In such embodiments, the service provider 107 acts as a trusted agent for the light client 106. In some embodiments, the service provider 107 delegates execution of finality proof validation to the light client support node 108. The delegation may occur directly between the service provider 107 and the support node 108 or may occur using the light client 106 as an intermediary. In some embodiments, the service provider does not have enough processing resources at its disposal to perform the validation. In some embodiments, the role of service provider can be performed by the light client entity 106 itself. In an alternative embodiment, the support node 108 may transmit the finality proof to a trusted agent, such as the service provide 107, for verification. In this embodiment, the service provider 107 does have sufficient processing resources to perform the validation.

A trusted execution environment (TEE) is an isolated environment with strictly defined entry and exit mechanisms, provided by a processor. In some embodiments, Intel processors or ARM processors may be used to implement the TEE. A TEE guarantees that code and data loaded inside the TEE will be protected with respect to confidentiality and integrity. The isolated instance of code running inside a TEE and its protected data is known as a trusted application.

Remote attestation allows a claim to be made about the properties of a target by supplying evidence to an appraiser over a network. In some embodiments, the TEE supports a form of remote attestation. A remote party can use the TEE to identify an instance of a specific trusted application executing on an authentic hardware platform. Additionally, a secure communication channel can be established with the trusted application bound to the result of remote attestation.

In one embodiment, a finality proof validation in a light client 106 for a permissioned blockchain system with byzantine fault-tolerant consensus protocol, such as Fabric v0.6 with practical byzantine fault tolerance (PBFT) consensus protocol, is provided. A finality proof in such a system, for example the system depicted in FIG. 1, is a collection of valid signatures form the peers, such as nodes 104, participating in the consensus protocol. In PBFT, the number of valid signatures in a valid finality proof must be greater than the number of tolerated faulty nodes. In some embodiments, the role of the light client support node 108 can be performed by one of the blockchain nodes 104.

Figure 2:
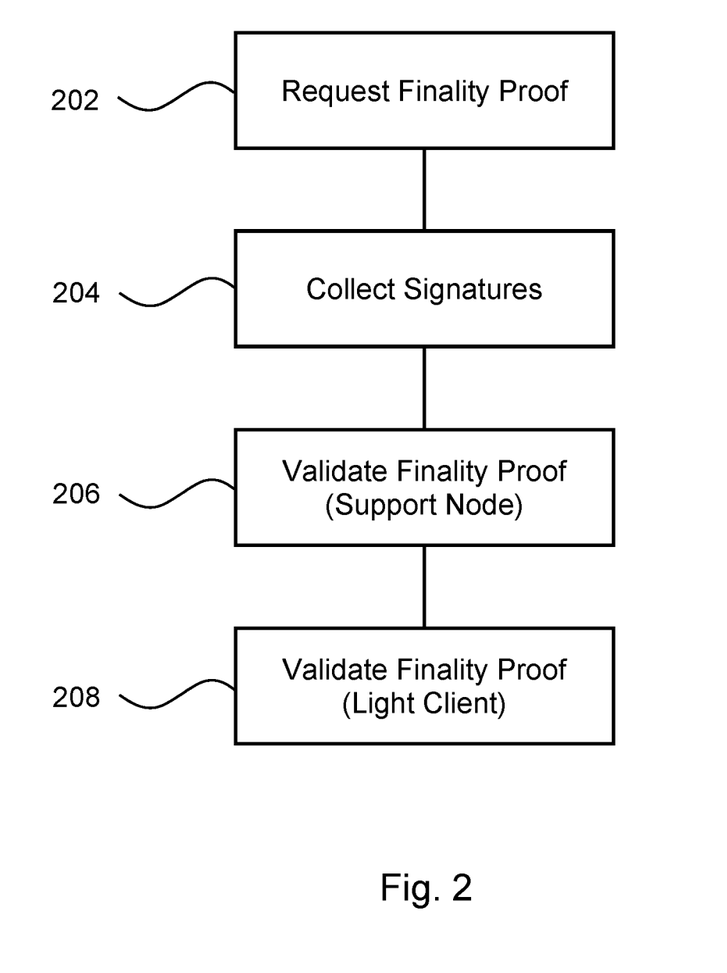
FIG. 2 illustrates a protocol for validating a finality proof from the blockchain network according to an embodiment.

FIG. 2 illustrates a protocol for validating a finality proof from the blockchain network using a support node and a light client, according to one embodiment. At step 202, the support node requests the finality proof from the blockchain network and at step 204, the support node collects the required number (2t+1, where t is the number of faulty nodes) of valid signatures from the blockchain nodes or peers.

At step 206, the support node validates the finality proof by verifying that there are at least 2t+1 correct endorsements. In the case of validation failure, the protocol is terminated with failure. Otherwise the support node transmits the finality proof to the light client. At step 208, the light client validates the finality proof received from the support node. In the case of validation failure, the finality proof is discarded and the protocol is terminated with failure. Otherwise, the finality proof is considered valid and saved by the light client.

This embodiment does not require the light client to have direct network communication with multiple blockchain network peers. Rather, the light client support node requests and collects the signatures required to construct a valid finality proof. This is an advantage in permissioned blockchain system because it restricts access to the blockchain peers. Additionally, the light client avoids the overhead of establishing multiple network connections to the blockchain peers. However, the light client is still required to perform a computational work by validating the set of signatures in the finality proof.

In another embodiment, TEE is used to reduce the computational work required by the light client. A mechanism of provable delegated code execution in TEE is provided. The mechanism is used to construct an efficient validation of finality proof.

A number of parties are used to provide provable delegated code execution in TEE. An authority implements logic in a form of program code, authority code, and wants this code to be executed on a computing platform which is not fully controlled by the authority, execution platform. An executor operates the execution platform which provides TEE, and that wants to provably execute the authority code. A verifier verifies the result of correct execution of authority code on the execution platform, given a specific input.

Figure 3:
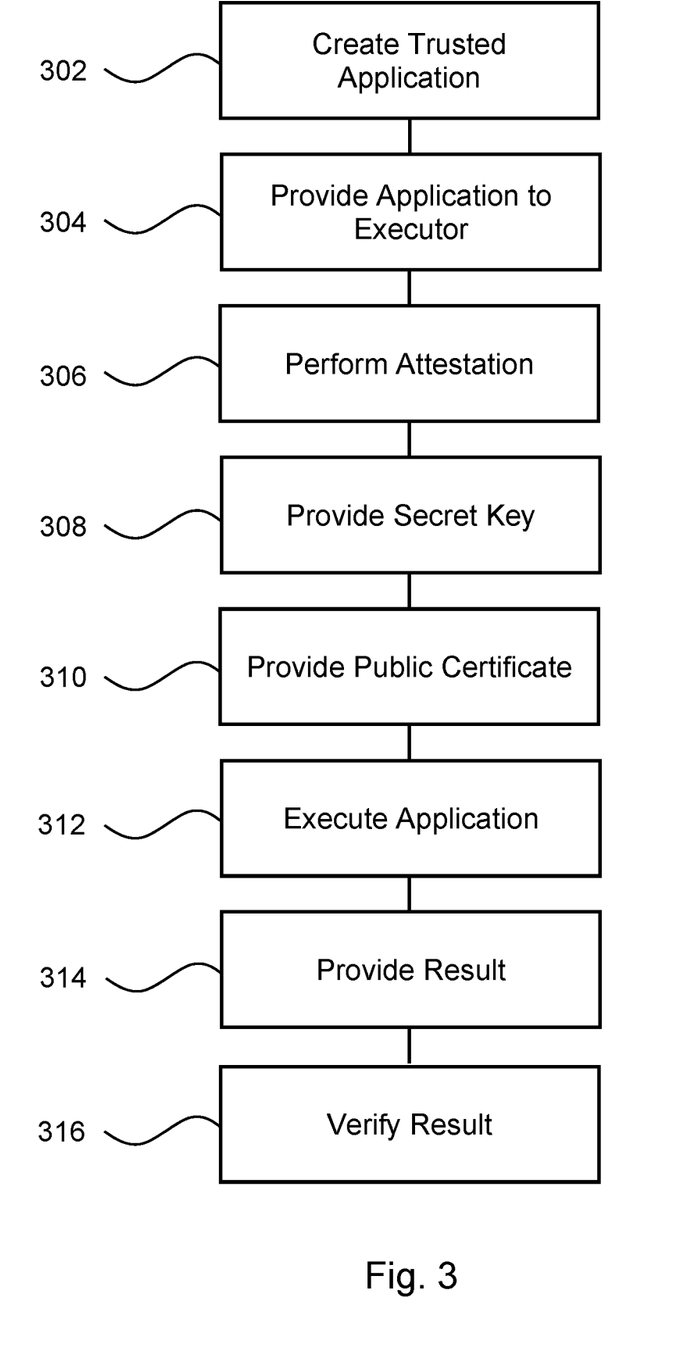
FIG. 3 illustrates a process executing code and providing proof of the output according to an embodiment.

FIG. 3 illustrates a process for an executor to execute the authority code given a specific input and prove to the verifier that the code has been correctly executed and has produced a particular output. At step 302 the authority creates a trusted application to be executed in the TEE of the execution platform. In some embodiments, the trusted application provides remote attestation as defined above. Further, the trusted application may provide provisioning of a secret using the secure channel established as part of the remote attestation such that the secret remains confidential to the trusted application. Additionally, the trusted application may provide execution of the authority code given a specific input producing the result of execution and a signature over the input combined with the result using a previously provisioned secret, proof of execution.

At step 304, the trusted application is delivered to executor and instantiated in TEE of the execution platform. At step 306, the authority performs remote attestation of the trusted application instance and the execution platform. In the case of successful attestation, a secure channel between the authority and the trusted application instance is established.

The secure channel is utilized to perform provisioning of a secret to the trusted application instance, at step 308. Additionally, a corresponding public certificate is derived. The public certificate can be used to verify a digital signature produced using the secret as a private key of a specific signature scheme.

At step 310, the authority makes the public certificate eventually available to the verifier. At step 312, the trusted application instance is used to execute the authority code given a specific input and produce the result together with the proof of execution.

At step 314, the input, result and proof of execution are provided to the verifier. Additionally, at step 316, the verifier uses the available public certificate and verifies the validity of proof of execution given the input and the result.

In one embodiment, the authority code is implemented using the Intel® 64 instruction set. The Intel® Software Guard Extensions (SGX) enabled platform is used as an execution platform. The Intel® Attestation Service for SGX (IAS) and standard remote attestation protocol of the Intel® SGX SDK are used for remote attestation and establishing a secure channel. The RSA digital signature algorithm and X.509 public key certificate format may be used for generation and verification of proof of execution. The authority possesses a valid verifiable X.509 CA certificate and the corresponding private key, $Authority_{CACert}$ and $Authority_{CAKey}$ correspondingly. $Authority_{CACert}$ is available to Executor and Verifier.

In some embodiments, the authority is registered within IAS as a service provider. The authority possesses a valid X.509 certificate and the corresponding private key suitable to generate an SGX enclave signature, $Authority_{EnclaveCert}$ and $Authority_{EnclaveKey}$ respectively. $Authority_{EnclaveCert}$ is signed with $Authority_{CAKey}$. The following protocol provides detailed description of the embodiment.

Figure 4:
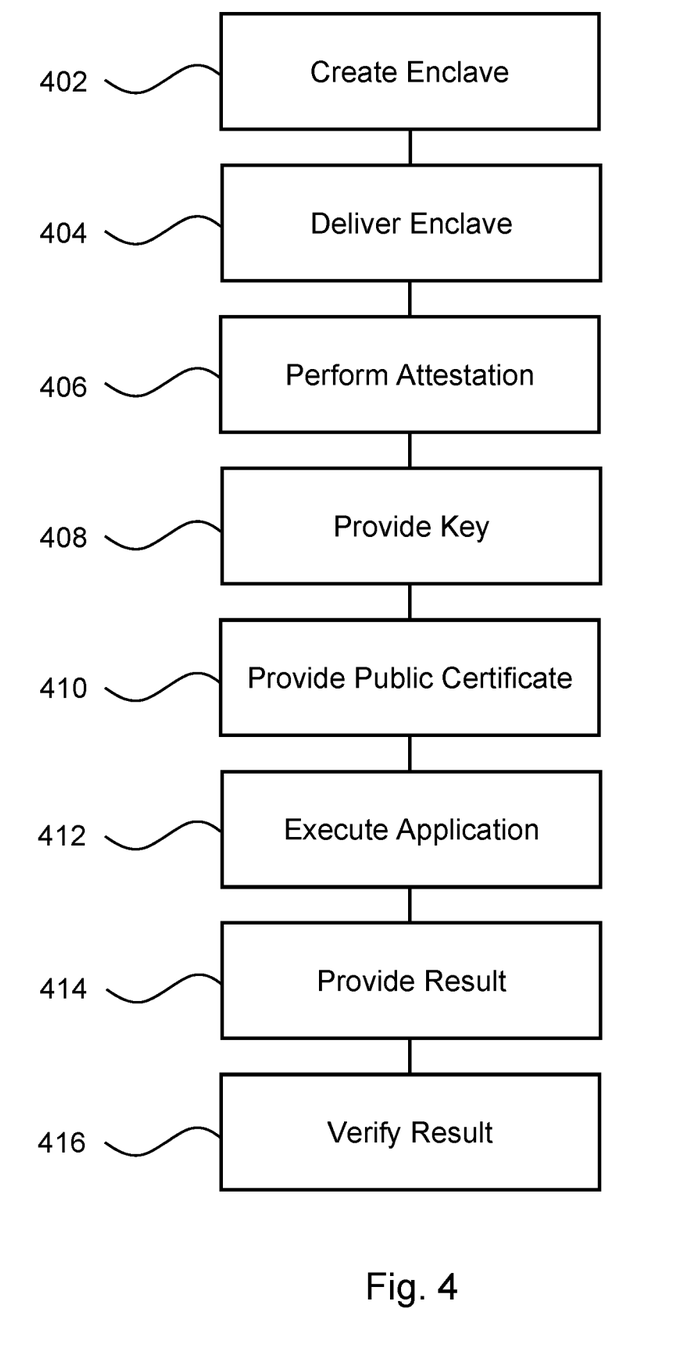
FIG. 4 illustrates a process executing code and providing proof of the output according to another embodiment.

FIG. 4 illustrates a process for an executor to execute the authority code given a specific input and prove to the verifier that the code has been correctly executed and has produced a particular output according to an embodiment.

At step 402, the authority creates an SGX enclave and produces a signed enclave file structure using $Authority_{EnclaveKey}$. The enclave provides the following entry points:
  initRa( ) initializes remote attestation process and returns the key exchange context, KEContext using standard remote attestation scheme of the SGX SDK;
  provision(KEContext) generates a pair of RSA keys, Secret and Public—secret and public keys, respectively; securely stores (seals) Secret; generates an X.509 certificate signing request, CSR, from Public; produces a message authentication code over CSR using the shared secret key, Shared, derived during the key exchange of remote attestation: $MAC_{CSR}$=AES_CMAC(Shared, CSR) and returns {CSR, $MAC_{CSR}$}; and
  execute(Input) executes the authority code passing Input as an input, receives the result of the execution Result, produces a proof of authority code execution in a form of digital signature using the provisioned secret: Signature=Sign(Secret, Input||Result) and returns {Result, Signature}.

At step 404, the signed enclave file is delivered to the executor. The executor creates an instance of the SGX enclave using the signed enclave file. The Intel® SGX platform checks the enclave signature and instantiates the enclave only if the signature is valid.

At step 406, the authority in coordination with the executor performs remote attestation of the execution platform and the enclave instance utilizing the enclave's initRa( ) entry point using the standard remote attestation scheme of the Intel® SGX SDK. In the case of successful attestation, a shared secret key, Shared, is derived during the key exchange procedure that is bound to the attestation results. On the executor side, Shared can only be retrieved by the enclave instance from KEContext. In case of attestation failure, the protocol terminates with failure.

At step 408, the key is provided. The executor uses enclave's provision(KEContext) entry point to get {CSR, $MAC_{CSR}$}. The executor delivers {CSR, $MAC_{CSR}$} to the authority.

At step 410, the public certificate is provided. The authority verifies that $MAC_{CSR}$ is valid and corresponds to the CSR using Verify_AES_CMAC(Shared, CSR, $MAC_{CSR}$). If the verification is successful then the authority generates an X.509 certificate, Cert, for the CSR signed with $Authoriy_{EnclaveKey}$, otherwise the protocol terminates with failure. The data {Cert, $Authority_{EnclaveCert}$} is transmitted to the executor, and the executor stores it in an unprotected storage.

At step 412, the executor produces {Result, Signature} using the enclave's execute(Input) entry point. At step 414, {Input, Result, Signature, Cert, $Authority_{EnclaveCert}$} is transmitted to the verifier. At step 416, the verifier uses Authority CA Cert, $Authority_{EnclaveCert}$ and Cert, to verify the Signature: Verify(Input Result, Signature, {$Authority_{CACert}$, $Authority_{EnclaveCert}$, Cert}). If the verification is successful then Result is deemed to be a proved result derived from execution of authority code, given Input as an input. If the verification is not successful, the protocol terminates with a failure.

In some embodiments, the service provider 107 is the authority. The support node 108 is the executor, and the light client 106 is the verifier.

Figure 5:
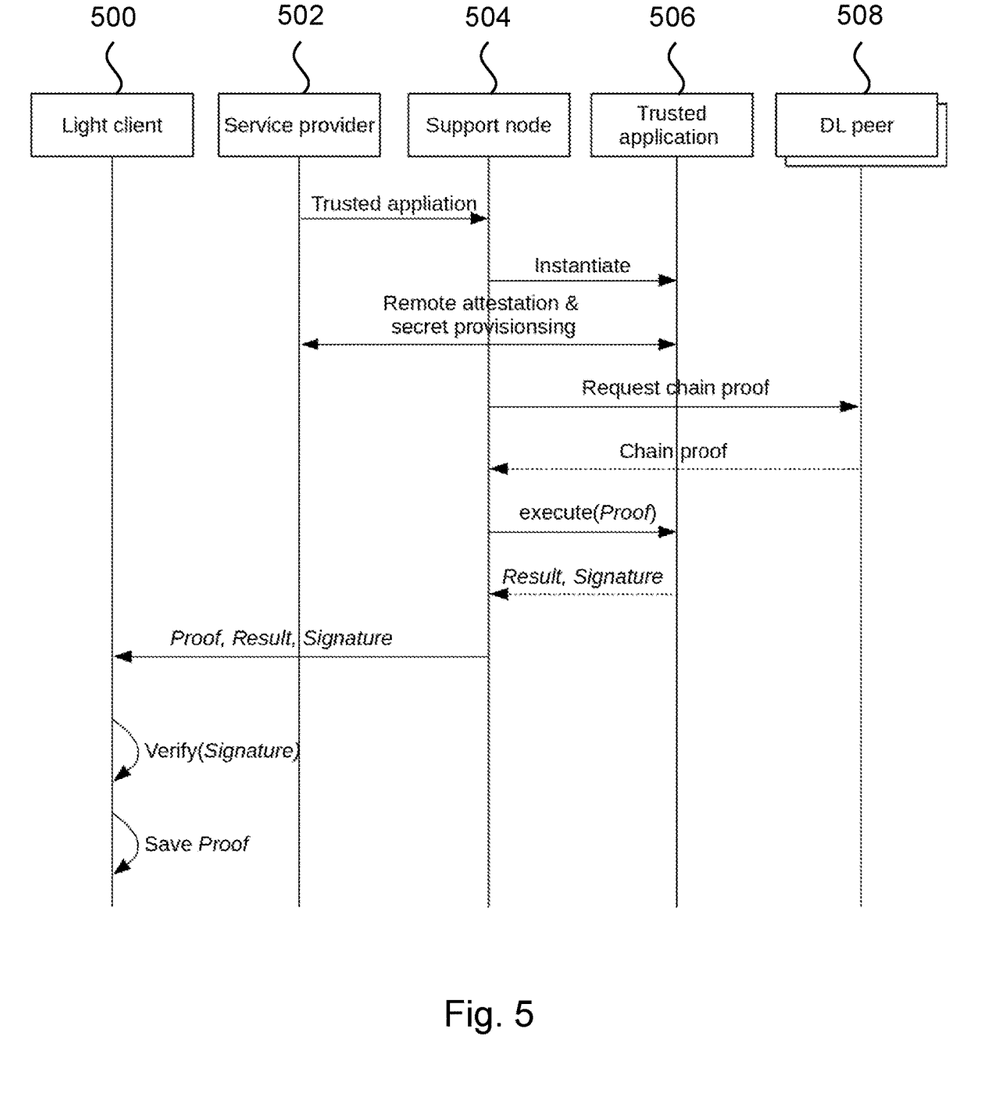
FIG. 5 illustrates an implementation of a protocol using TEE in a DL system according to an embodiment.

FIG. 5 illustrates an implementation of a protocol using TEE in a DL system. The service provider 502 creates a trusted application, implementing the finality proof validation as authority code. The trusted application is sent to the support node 504 and instantiated in a trusted application 506 of the TEE of the execution platform.

The service provider 502 performs remote attestation of and provisions a secret to the trusted application 506, then makes the corresponding public certificate eventually available to the light client 500. In this embodiment, the service provider 502 acts as a trusted entity. The support node 504 requests a finality proof from the DL network, including one or more DL peers 508. The trusted application 506 instance is used to execute the finality proof validation using it as an input and producing the validation status as a result together with the proof of finality proof validation execution. If the finality proof validation status shows failure, then the protocol terminates with a failure. If the finality proof validation status is successful, the finality proof and the proof of execution are delivered to the light client 500.

The light client 500 validates the proof of finality proof validation execution. The light client 500 also verifies the result of the finality proof validation. In the case of failure, the finality proof is discarded and the protocol terminates with a failure. In the case of success, the finality proof is considered valid and saved.

In this embodiment, a finality proof saved by the light client fulfills the finality criteria and the corresponding fact can be considered finalized in the distributed ledger.

In another embodiment, the DL network is implemented as a Hyperledger Fabric v1 blockchain system (Fabric). In this embodiment, the light client supporting node is a fabric client. The finality criteria in the fabric is represented by the endorsement policy associated with a particular chaincode. The finality proof can be represented as a valid endorsement of a specific invocation that satisfies the endorsement policy. An example of such invocation can be a query invocation to request a particular piece of information stored in the chaincode state. Another example can be an invocation of query system chaincode (QSCC). The finality proof validation is the same process as performed by validation system chaincode (VSCC) during normal endorsement validation on the committing peer.

Figure 6:
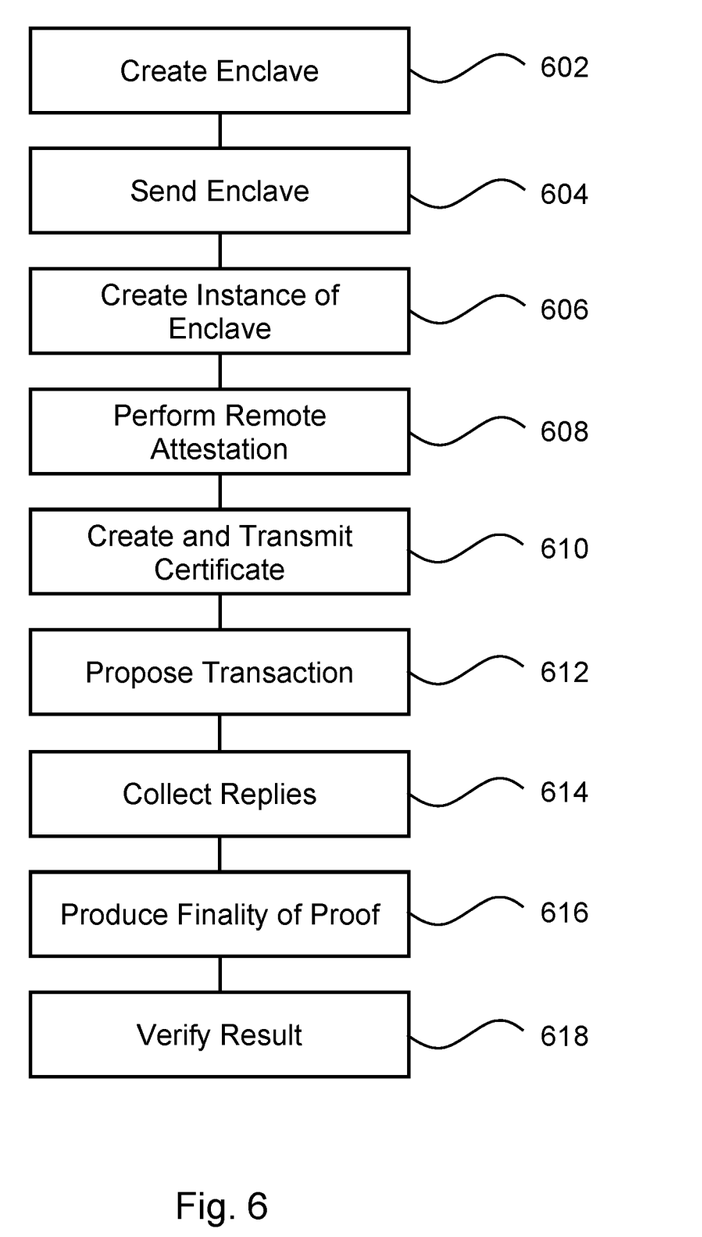
FIG. 6 illustrates a protocol for validating a finality proof from the blockchain network according to an embodiment.

FIG. 6 illustrates a protocol for validating a finality proof from the blockchain network according to an embodiment. At step 602, the service provider creates an SGX enclave, using the endorsement validation as authority code. At step 604, the singed enclave file is sent to the support node. The support node creates an instance of the SGX enclave using the signed enclave file, at step 606.

At step 608, the service provider performs remote attestation of and provisions an RSS private key to the SGX enclave. At step 610, the service provider issues and transmits the corresponding X.509 certificate to the support node to be stored.

At step 612, the support node creates a new invoke transaction, Transaction, and proposes it to a set of endorsing peers. At step 614, the support node collects a sufficient set of endorsement replies from the endorsing peers to construct a valid endorsement for the transaction, Endorsement.

At step 616, using the enclave execute(Input) entry point and Endorsement as input, the support node produces the finality proof validation status as a result together with the proof of execution, {Result, Signature}. If the finality proof validation status shows failure then the protocol terminates with a failure. Otherwise, {Endorsement, Result, Signature, Cert, Authority$_{EnclaveCert}$} is transmitted to the light client.

At step 618, the light client checks Result and validates Signature. In the case of failure, the finality proof is discarded, and the protocol terminates with a failure. In the case of success, Endorsement is considered valid and saved.

Figure 7:
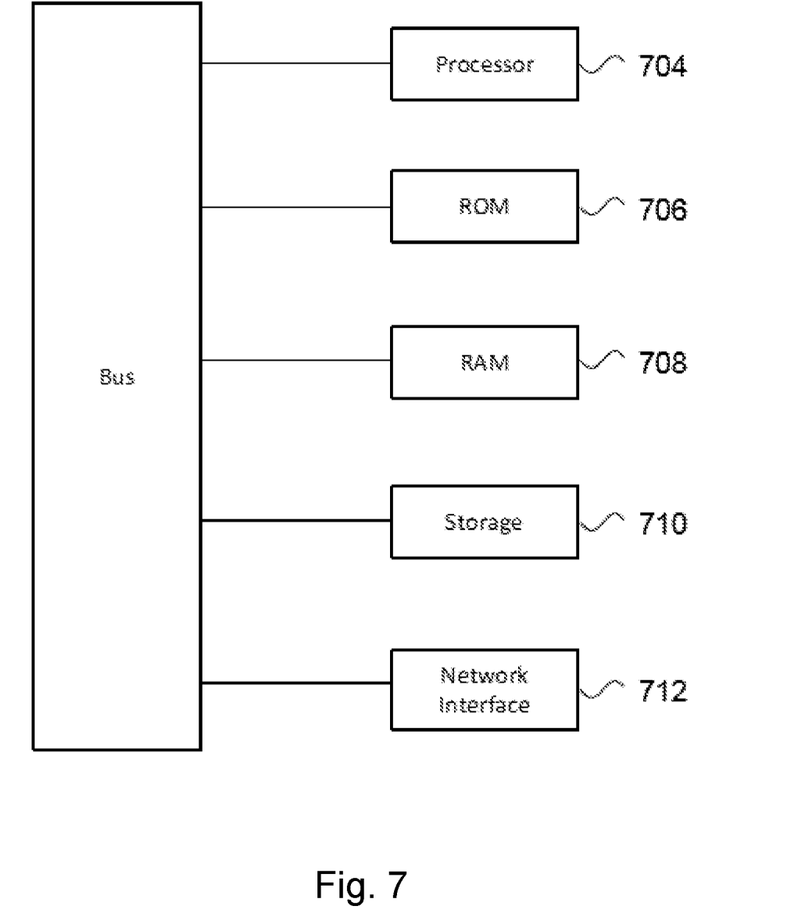
FIG. 7 illustrates a block diagram of a processing system according to one embodiment.

FIG. 7 is a block diagram of a processing system according to one embodiment. The processing can be used to implement the protocols, systems and nodes described above. The processing system includes a processor 704, such as a central processing unit (CPU) of the computing device or a dedicated special-purpose infotainment processor, executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network, such as the internet.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for validation of a finality proof in a distributed ledger system network, the method comprising:
   requesting, by a support node, a finality proof from the distributed ledger system network, including a plurality of distributed ledger system network peers;
   collecting, by the support node, a required number of confirmations from a plurality of peers in the distributed ledger system network indicating that a requested transaction is finalized;
   determining, by the support node, a number of valid confirmations in the required number of confirmations;
   determining, by the support node, a number of faulty peers in the plurality of peers;
   executing, by the support node, a trusted application;
   generating, by the support node, the finality proof based on the required number of collected confirmations, the number of valid confirmations, and the number of faulty peers;
   verifying, by the support node, the finality proof inside the trusted application;
   signing, by the support node, the finality proof validation inside the trusted application;
   transmitting, by the support node, the signed finality proof validation to a client, wherein the client is one of an internet of things (IoT) device, an embedded hardware, a smartphone and a browser extension; and
   supplying the validation result, a proof of execution, and the finality proof to the client, wherein the client confirms, based on the validation result, the proof of execution, and the finality proof, that the requested transaction is finalized in the distributed ledger, wherein the support node is an intermediary between the client and the distributed ledger system and the client does not participate in the distributed ledger system.

2. The method according to claim 1 further comprising: confirming, by the trusted agent based on the verification, that the requested transaction is finalized in the distributed ledger.

3. The method according to claim 1, wherein the executing, performing, signing, and transmitting steps are each performed by an executor.

4. The method according to claim 1, wherein executing the trusted application further comprises:
implementing code in a form of the trusted application to be executed in a trusted execution environment (TEE);
instantiating the trusted application in the TEE;
attesting remotely the integrity of the trusted application;
establishing a secure and authenticated channel with the trusted application instance; and
provisioning of a secret key to the trusted application instance through the established channel.

5. The method according to claim 1, wherein the signing step further comprises:
producing, with the secret provisioned to the trusted application instance, a digital signature over an input combined with a result of the trusted application instance execution.

6. The method according to claim 1, further comprising:
verifying, with a public certificate corresponding to the provisioned secret, the digital signature produced by the trusted application instance as a proof of the trusted application execution.

7. The method according to claim 1, wherein performing the finality proof validation inside the trusted application further comprises:
executing the finality proof validation using the trusted application instance to generate a result.

8. The method according to claim 1, further comprising performing a finality proof validation inside a trusted application by a node in the distributed ledger system.

9. The method according to claim 1, wherein the distributed ledger system network is a blockchain network.

10. A support node in a distributed ledger system network, the support node comprising one or more processors which, alone or in combination, are configured to provide for performance of the following steps:
requesting, by the support node, a finality proof from the distributed ledger system network, including a plurality of distributed ledger system network peers;
collecting, by the support node, a required number of confirmations from a plurality of peers in the distributed ledger system network indicating that a requested transaction is finalized;
determining, by the support node, a number of valid confirmations in the required number of confirmations;
determining, by the support node, a number of faulty peers in the plurality of peers;
executing, by the support node, a trusted application;
generating, by the support node, the finality proof based on the required number of collected confirmations, the number of valid confirmations, and the number of faulty peers;
verifying, by the support node, the finality proof inside the trusted application;
signing, by the support node, the finality proof validation inside the trusted application;
transmitting, by the support node, the signed finality proof validation to a client, wherein the client is one of an internet of things (IoT) device, an embedded hardware, a smartphone and a browser extension; and
supplying the result, a proof of execution, and the finality proof to the client, wherein the client confirms, based on the result, the proof of execution, and the finality proof, that the requested transaction is finalized in the distributed ledger, wherein the support node is an intermediary between the client and the distributed ledger system and the client does not participate in the distributed ledger system.

11. The system according to claim 10, wherein the client includes one or more processors which, alone or in combination, are configured to provide for performance of the following step: verifying, by the client, the signature of the finality proof validation.

* * * * *